United States Patent
Cecka et al.

(10) Patent No.: US 9,477,579 B2
(45) Date of Patent: Oct. 25, 2016

(54) EMBEDDED SOFTWARE DEBUG SYSTEM WITH PARTIAL HARDWARE ACCELERATION

(71) Applicants: Kenneth E. Cecka, Snohomish, WA (US); James T. Woodward, Round Rock, TX (US)

(72) Inventors: Kenneth E. Cecka, Snohomish, WA (US); James T. Woodward, Round Rock, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 190 days.

(21) Appl. No.: 13/963,256

(22) Filed: Aug. 9, 2013

(65) Prior Publication Data
US 2015/0046753 A1     Feb. 12, 2015

(51) Int. Cl.
*G06F 11/36*     (2006.01)

(52) U.S. Cl.
CPC .................. *G06F 11/3656* (2013.01)

(58) Field of Classification Search
CPC ............ G06F 11/362; G06F 11/3656; G06F 11/3664
See application file for complete search history.

(56) References Cited

U.S. PATENT DOCUMENTS

| | | | | |
|---|---|---|---|---|
| 5,815,653 A * | 9/1998 | You | G06F 11/3664 | 714/25 |
| 6,005,942 A * | 12/1999 | Chan et al. | | 713/187 |
| 6,011,916 A * | 1/2000 | Moore et al. | | 717/104 |
| 6,061,518 A * | 5/2000 | Hoffman | G06F 11/362 | 714/38.1 |
| 6,119,247 A * | 9/2000 | House | G06F 11/362 | 714/E11.209 |
| 6,151,701 A * | 11/2000 | Humphreys | G06F 11/362 | 714/E11.209 |
| 6,311,326 B1 * | 10/2001 | Shagam | G06F 11/3636 | 714/E11.21 |
| 6,539,501 B1 * | 3/2003 | Edwards | | 714/45 |
| 6,631,345 B1 * | 10/2003 | Schumacher | G06F 9/45512 | 703/14 |
| 6,757,895 B1 * | 6/2004 | Beadle | G06F 9/4443 | 713/1 |
| 6,934,937 B1 * | 8/2005 | Johnson | G06F 11/3628 | 712/227 |
| 7,039,703 B1 * | 5/2006 | Clancy | H04Q 11/0457 | 709/225 |
| 7,165,241 B2 * | 1/2007 | Manda et al. | | 717/124 |
| 7,216,300 B2 * | 5/2007 | Dang | | 715/783 |
| 7,296,187 B1 | 11/2007 | Fritz et al. | | |

(Continued)

FOREIGN PATENT DOCUMENTS

| | | |
|---|---|---|
| CN | 101187911 B | 5/2008 |
| CN | 101930395 A | 12/2010 |

*Primary Examiner* — Loan L. T. Truong (57) ABSTRACT

An embedded software debug system with partial hardware acceleration includes a computer that executes a debug software stack. The debug software stack includes high level operations. The system also includes a remote microcontroller electronically connected to the computer. The system further includes an embedded processor electronically connected to the remote microcontroller. The remote microcontroller receives an applet from the computer and executes the applet in conjunction with the computer executing the debug software stack to debug the embedded processor. The applet includes low level protocol operations including performance critical tight-loops precompiled into machine code. The debug software stack may include a stub that replaces the tight-loops of the applet. The computer may send the applet to the remote microcontroller in response to executing the stub.

4 Claims, 9 Drawing Sheets

(56) References Cited

U.S. PATENT DOCUMENTS

| | | | |
|---|---|---|---|
| 7,546,584 B2* | 6/2009 | Rovang | G06F 11/3414 702/122 |
| 7,634,760 B1* | 12/2009 | Gumtow | G06F 11/3664 714/38.14 |
| 7,644,312 B2* | 1/2010 | Hind | G06F 11/366 714/38.14 |
| 7,827,510 B1* | 11/2010 | Schubert | G06F 17/5027 716/111 |
| 8,001,531 B1* | 8/2011 | Rideout | G06F 11/362 709/217 |
| 8,336,029 B1* | 12/2012 | McFadden | G06F 9/45516 717/100 |
| 9,009,676 B2* | 4/2015 | Chua | G06F 11/3414 717/127 |
| 9,146,832 B2* | 9/2015 | Degenhardt | G06F 11/3632 |
| 2002/0059054 A1* | 5/2002 | Bade | G06F 17/5022 703/20 |
| 2002/0083154 A1* | 6/2002 | Auffray et al. | 709/218 |
| 2002/0093856 A1* | 7/2002 | Baentsch | G06F 9/44589 365/200 |
| 2002/0100038 A1* | 7/2002 | Balassanian | 717/177 |
| 2003/0140230 A1* | 7/2003 | de Jong | H04L 63/0407 713/182 |
| 2004/0015664 A1* | 1/2004 | Ciesinger et al. | 711/154 |
| 2004/0103394 A1* | 5/2004 | Manda et al. | 717/126 |
| 2004/0205560 A1* | 10/2004 | Polk | G06F 17/272 715/234 |
| 2004/0230954 A1* | 11/2004 | Dandoy | 717/124 |
| 2005/0183066 A1* | 8/2005 | Jabori | G06F 11/3636 717/124 |
| 2007/0094532 A1* | 4/2007 | Sengupta | G06F 11/3632 714/5.1 |
| 2007/0157051 A1* | 7/2007 | Hernandez et al. | 714/1 |
| 2009/0210862 A1* | 8/2009 | Viswanadha | G06F 11/3664 717/125 |
| 2010/0107146 A1* | 4/2010 | Wrighton | G06F 11/3664 717/134 |
| 2010/0153921 A1* | 6/2010 | Klein | G06F 11/3636 717/124 |
| 2010/0162049 A1* | 6/2010 | Stall | G06F 11/3644 714/38.14 |
| 2010/0240317 A1* | 9/2010 | Giles et al. | 455/67.13 |
| 2010/0287562 A1* | 11/2010 | Jazdzewski | G06F 11/3664 719/313 |
| 2011/0023019 A1* | 1/2011 | Aniszczyk | G06F 9/445 717/128 |
| 2011/0289484 A1* | 11/2011 | Caine | G06F 8/30 717/127 |
| 2011/0296385 A1* | 12/2011 | Wielaard | 717/124 |
| 2012/0017204 A1* | 1/2012 | Hrischuk et al. | 717/151 |
| 2012/0151446 A1* | 6/2012 | Sathya | G06F 11/3656 717/125 |
| 2012/0317552 A1* | 12/2012 | Bates | 717/129 |
| 2013/0111270 A1* | 5/2013 | Kimura | G06F 11/3664 714/37 |
| 2013/0185770 A1* | 7/2013 | Patil | 726/4 |
| 2014/0282415 A1* | 9/2014 | Ovadia et al. | 717/125 |

* cited by examiner

EMBEDDED SOFTWARE DEBUG SYSTEM WITH PARTIAL HARDWARE ACCELERATION

TECHNICAL FIELD OF THE INVENTION

The present invention relates generally to an embedded software debug system. More specifically, the present invention relates to an embedded software debug system with partial hardware acceleration for debugging a processor executing embedded software, wherein performance-critical sections of a debug software stack are deployed to a remote microcontroller that is connected directly to the target, thereby improving performance.

BACKGROUND OF THE INVENTION

Embedded software debug tools are used in the debugging of an embedded system (e.g., a computer system with a dedicated function that is located in a larger electrical system). An embedded system includes an embedded processor that executes embedded software. It is important to debug embedded systems in order to ensure that the dedicated function to be performed by the embedded system operates as it is intended.

An example of an existing debug tool includes complex and expensive hardware, wherein the debug software stack runs on a probe, thereby requiring a powerful processor on the probe in order to run properly. Other existing debug tools include low-cost hardware wherein the debug software stack runs on a PC and issues many network/USB transactions over a high-latency connection to the embedded processor, which can result in poor performance. Another existing debug tool utilizes mid-cost hardware with marginal performance and high engineering maintenance cost, wherein the mid-cost hardware is a full-featured probe on which the entire debug software stack has been carefully written to run to debug one specific processor. Any use of the probe to debug another type of processor involves writing a new debug software stack and optimizing the same to run on the probe. Each of these existing debug tools lack the ability to utilize a PC and probe in a manner that balances efficiency and cost in order to debug an electronic system with embedded software.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, the Figures are not necessarily drawn to scale, and:

DETAILED DESCRIPTION

Virtually all modern embedded processors provide a hardware port for controlling and debugging software running on the processors. These ports typically consist of a small number of pins and a very simple, tow-level protocol for communicating with debug logic in the processor. Processor designers try to minimize the number of pins and amount of logic dedicated to debug because embedded systems are being developed with more on-board RAM, Flash and peripherals, thereby resulting in less need for external buses. Accordingly, these ports typically use some kind of serial interface, such as, but not limited to a Joint Test Action Group (hereinafter "JTAG") or Background Debug Mode (hereinafter "BDM") interface.

To make up for the lack of debug functionality on the embedded processor itself, the processor designers expect an external debugger to implement software. The external debugger accepts high level debug operations from a user and translates the high level debug operations into appropriate low level protocol operations that can be sent directly to the processor's hardware debug port. Existing debug systems for embedded system software employ two types of strategies. The first strategy includes software that runs on a computer and sends low level protocol operations over some connection scheme, such as, hut not limited to a USB, Ethernet or electronic connection that allows for communication along the connection line, to a hardware adapter that connects to the processor's hardware port. While the hardware is typically inexpensive and small, the system runs very slowly because of the time it takes to send many low level protocol operations over a high-latency link between the computer and the adapter, i.e. a link that may experience significant transmission delays.

The second strategy includes software that runs on a complex hardware probe, which itself houses an embedded system that can run the entire debug software stack. The computer provides a thin user interface, which sends high level debug commands to the probe. The probe then translates these into low level protocol operations that it can send directly to the processor's hardware port. This type of system runs very fast because only large, high level requests are sent over the high-latency link between the computer and the complex hardware probe, while all low level protocol operations are sent from the probe to the processor's debug port directly through a low-latency connection, i.e., a link with insignificant transmission delays.

Embodiments of the present invention include a debug system for embedded software that executes high-level operations on a computer and sends performance-critical tight loops to a remote microcontroller that is connected to an embedded processor (e.g., a probe connector). High-level operations include commands written in a higher level language. Performance-critical tight loops are sets of commands that can be written in binaries and executed a predetermined amount of times by the remote microcontroller to send requests to the embedded processor and receive responses. By virtue of having these performance-critical tight loops executed close to the test port of the embedded processor, the number of commands sent over the high-latency link with the computer are reduced, and debug performance is enhanced.

Figure 1:
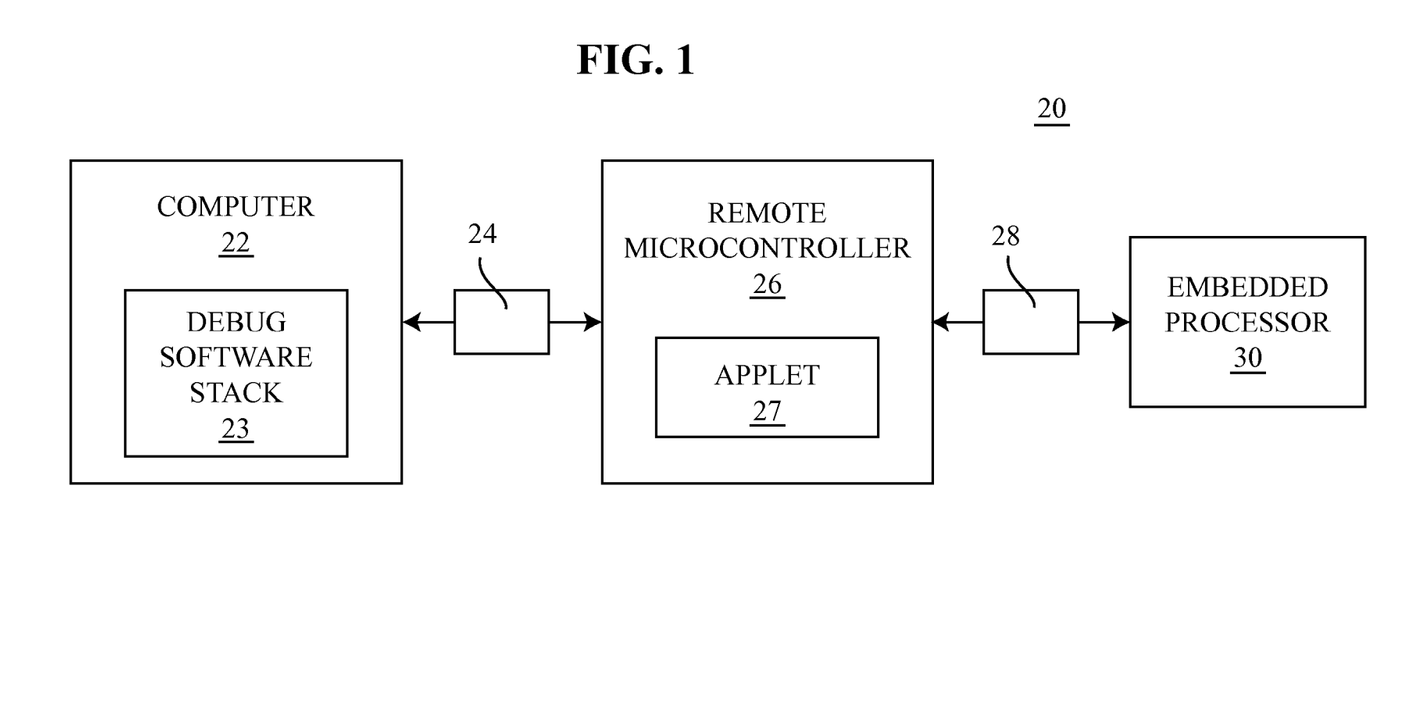
FIG. 1 shows a block diagram of an embedded software debug system with partial hardware acceleration.

FIG. 1 shows a block diagram of an embedded software debug system 20 with partial hardware acceleration, in accordance with the present invention. System 20 includes a computer 22, a remote microcontroller 26 electronically connected to computer 22, and an embedded processor 30 electronically connected to remote microcontroller 26. Computer 22 is a computing system comprising a processor configured to execute a debug software stack, wherein the debug software stack includes a set of instructions for debugging software instructions executing on embedded processor 30. Computer 22 may include a server, a desktop computer, a laptop computer, a handheld computer, a tablet computer, a smartphone and the like. In some embodiments, remote microcontroller 26 is electronically connected to computer 22 with a high-latency connection 24. Also, in some embodiments, embedded processor 30 is electronically connected to microcontroller 26 with a low-latency connection 28. Embedded processor 30 is configured to execute embedded software instructions and system 20 operates to debug the embedded software instructions.

It will be understood that electronically connected is a communicative connection, wherein data may be sent between components of embedded software debug system 20. It will also be understood that software is a set of code or instructions that are executed by a computing device, wherein the execution of the software results in the performing of specific tasks by the computing device.

In embedded software debug system 20, computer 22 includes a memory to store a debug software stack 23, and further computer 22 includes a processor for executing debug software stack 23. Computer 22 sends an applet 27 generated from a subset of debug software stack 23 to microcontroller 26 through connection 24, such as a high-latency connection. Applet 27 includes instructions for use in the debug process, as will be explained in greater detail below.

The sending of applet 27 from computer 22 enables partial hardware acceleration, wherein partial portions of existing source code from which debug software stack 23 is derived from are sent to hardware, such as remote microcontroller 26, to perform certain debugging tasks resulting in an acceleration of the debugging process. Remote microcontroller 26 executes applet 27 and sends protocol operations to embedded processor 30 through low-latency connection 28, such as a JTAG connection. System 20 debugs software executing on embedded processor 30 by executing applet 27 on remote microcontroller 26 in conjunction with executing debug software stack 23 on computer 22.

In some embodiments, system 20 may include multiple remote microcontrollers 26 electronically connected to multiple embedded processors 30, or may include remote microcontroller 26 connected to multiple embedded processors 30. For clarity and ease of description, only a single remote microcontroller 26 and a single embedded processor 30 are shown.

Figure 2:
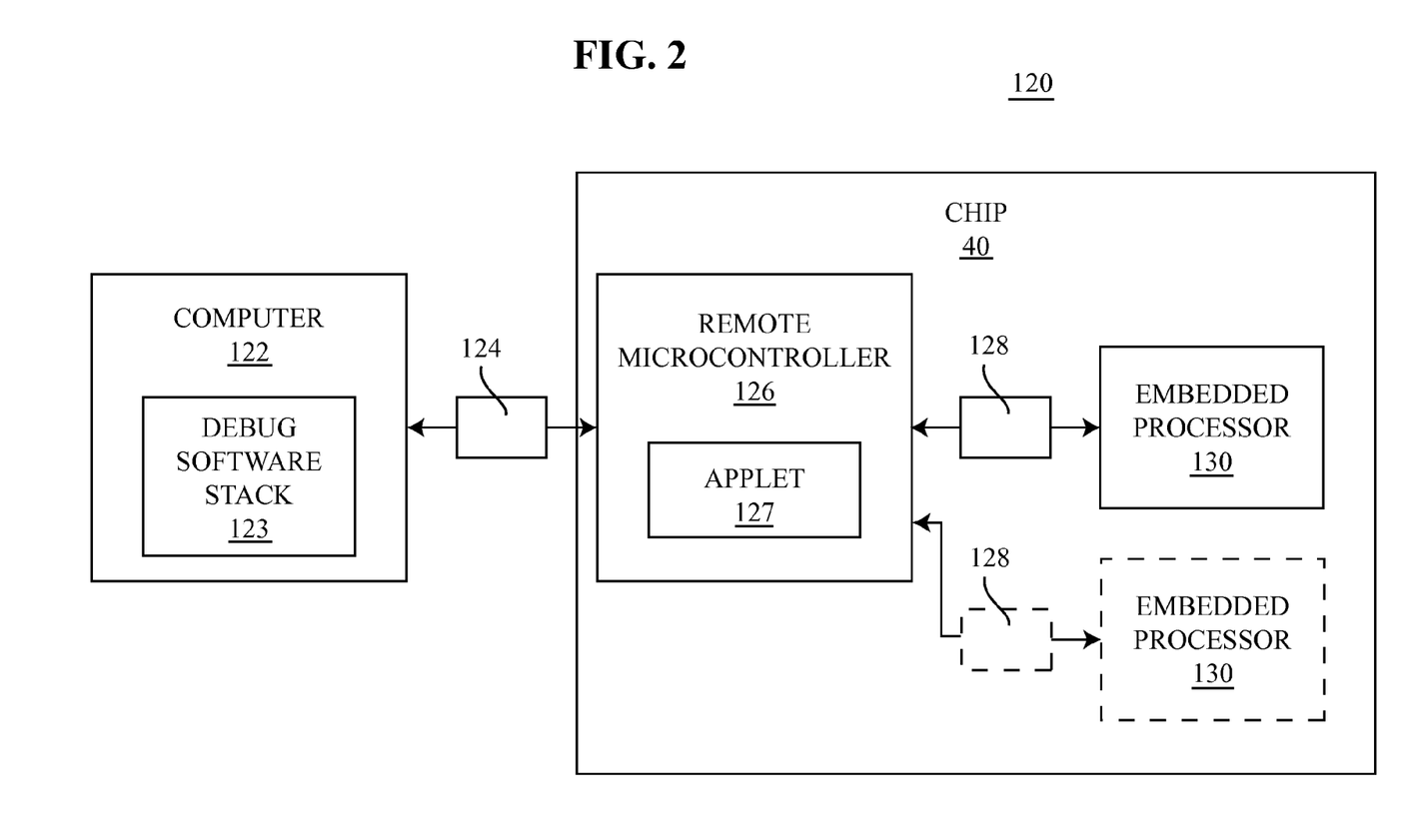
FIG. 2 shows another block diagram of an embedded software debug system with partial hardware acceleration.

FIG. 2 shows another block diagram of an embedded software debug system 120 with partial hardware acceleration. System 120 includes a computer 122 and a chip 40. Chip 40 includes a remote microcontroller 126 electronically connected to computer 122, and an embedded processor 130 electronically connected to remote microcontroller 126. Remote microcontroller 126 is electronically connected to computer 122 with a high-latency connection 124. Embedded processor 130 is electronically connected to microcontroller 126 with a low-latency connection 128.

In embedded software debug system 120, computer 122 includes a memory to store a debug software stack 123, and further computer 122 includes a processor for executing debug software stack 123. Computer 122 sends an applet 127 to microcontroller 126 through connection 124, such as a high-latency connection. Applet 127 is similar to applet 27 and includes source code for use in the debug process as will be explained in greater detail later in this disclosure with regard to applet 27. Further in system 120, remote microcontroller 126 is a core on chip 40 that is electronically connected to one or more embedded processors 130 located on chip 40. In these embodiments, remote microcontroller 126 remains a part of chip 40 even after debugging is completed. Further, in these embodiments, the electronic connection between remote microcontroller 126 and embedded processor 130 is located on chip 40 as a direct connection. In operation, remote microcontroller 126 executes applet 127 and sends protocol operations to embedded processor 130 through low-latency connection 128, such as a HAG port. System 120 debugs embedded processor 130 by executing applet 127 on remote microcontroller 126 in conjunction with executing debug software stack 123 on computer 122. Executing applet 127 on remote microcontroller 126 in conjunction with executing debug software stack 123 on computer 122 in order to debug software executing on embedded processor 130 is essentially the same as the discussion with reference to FIG. 8 provided later in this disclosure.

Figure 3:
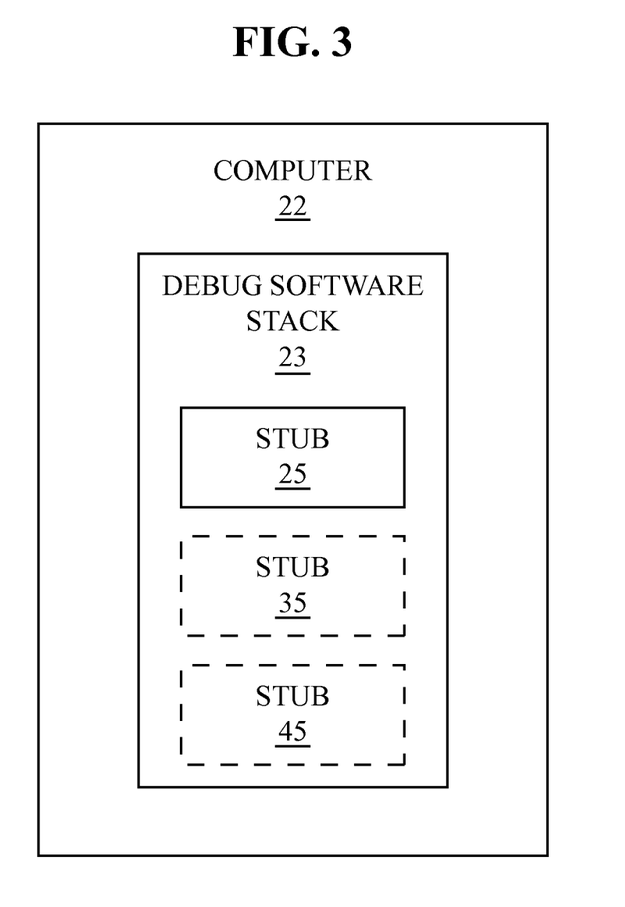
FIG. 3 shows a block diagram of a computer of an embedded software debug system with partial hardware acceleration.

FIG. 3 shows a block diagram of computer 22 of embedded software debug system 20. Computer 22 includes debug software stack 23 stored on and executable by computer 22. Debug software stack 23, according to some embodiments, is formed from existing software debug code with slight modifications that do not require entire rewrites of the existing code to form the debug software stack 23. The slight modifications of the existing software debug code include forming applet 27 (FIG. 1) from portions of the existing software debug code. Applet 27 (FIG. 1) includes performance-critical tight loops, which are a subset of the existing code from which debug software stack 23 derived. System 20 replaces the performance-critical tight loops in debug software stack 23 with one or more stubs 25, 35, 45. In some embodiments, a debug software designer identifies and flags the performance-critical tight loops or low level protocol operations, wherein subsequent debug software stack builds recognize these flags and automatically compile the flagged code into applet 27 and automatically replace the same with stubs 25, 35, 45. In some embodiments, performance-critical tight loops may be identified automatically by a computer executing certain software written specifically to identify the performance-critical tight loops and replace the same with stubs 25, 35, 45. In other embodiments, a debug software designer may identify the performance-critical tight loops and replace the same with stubs 25, 35, 45. Performance-critical tight loops are characterized as sets of commands that can be written in binaries to be executed a predetermined amount of times in order to send requests to embedded processor 30 and receive responses. Computer 22 sends applet 27 to remote microcontroller 26 in response to computer 22 executing stub 25. Therefore, system 20 utilizes existing code with a minor modification wherein the tight loops are removed and compiled into applet 27 and then replaced with stubs 25, 35, 45 in order to effect the sending of applet 27 to remote microcontroller 26 (FIG. 1).

Applet 27 includes source code that is compiled prior to sending to remote microcontroller 26. Precompiled source code of applet 27 includes source code compiled into machine code (e.g., binaries for use and execution by remote microcontroller 26). In embodiments, applet 27 is limited self-contained code, wherein the only external dependencies include protocol operations from remote microcontroller 26 to embedded processor 30 through low-latency connection 28 (FIG. 1).

Figure 4:
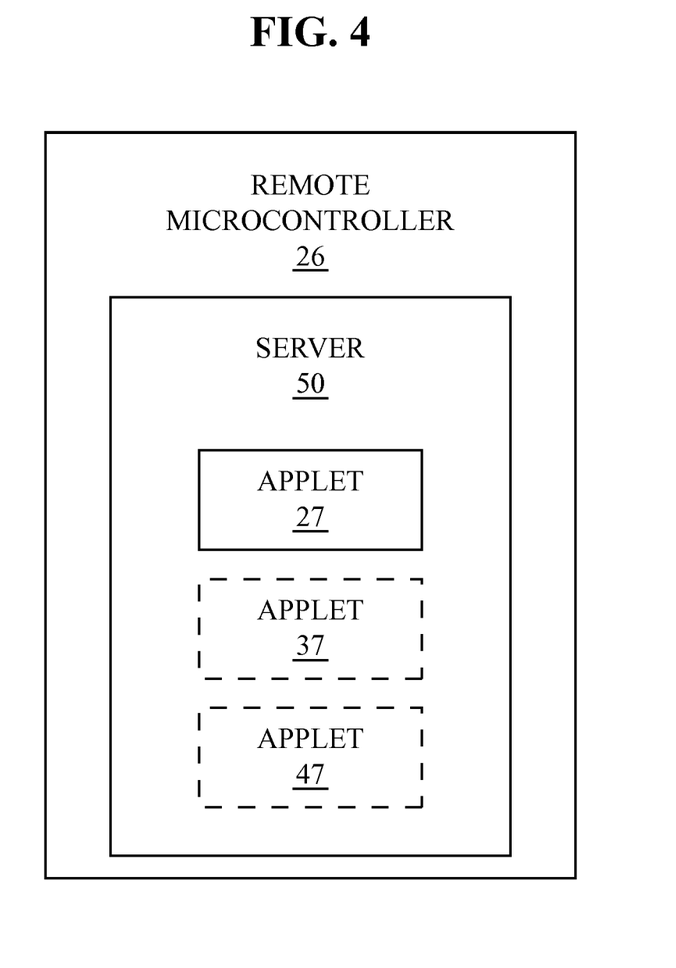
FIG. 4 shows a block diagram of a remote microcontroller of an embedded software debug system with partial hardware acceleration.

FIG. 4 shows a block diagram of remote microcontroller 26 of embedded software debug system 20 (FIG. 1) in according with embodiments of the present invention. Remote microcontroller 26 includes a server 50 that includes a memory 55 and microprocessor. In embodiments, server 50 operates to cache applets 27 sent from computer 22. In some embodiments, server 50 has sufficient memory to store a single applet, such as, but not limited to, the last run applet 27. In some embodiments, server 50 has sufficient memory to store multiple applets 27, 37, 47. Memory 55 can be volatile or non-volatile memory, depending on the application.

Caching of the one or more applets 27, 37, 47 improves the speed of operation of system 20. For example, and without limitation, if in a debugging process, the same task is run multiple times, remote microcontroller 26 can cache an applet 27 that performs that task and continue to execute the same applet 27 without the need of downloading applet 27 from computer 22 for each run of applet 27. Additionally, if multiple applets 27, 37, 47 are executed, microcontroller 26 can store applets 27, 37, 47 and execute each without the need of downloading between execution of each applet 27, 37, 47, thereby improving efficiency.

In some embodiments, applet 27 may include code that extends beyond sending protocol operations to embedded processor 30. Applet 27 may further include executable source code precompiled into native microcontroller machine code for remote microcontroller 26 that opens a streaming communication between computer 22 (FIG. 1) and remote microcontroller 26 (FIG. 1). Streaming communication between computer 22 and remote microcontroller 26 allows data to progressively stream to applet 27 on remote microcontroller 26 or to stream data from remote microcontroller 26 to computer 22 for additional processing of the data streamed from remote microcontroller 26 to computer 22. In this manner, applets may include a large amount of data can then be reduced in size to only such information that needs to initially be executed and then computer 22 streams the remaining precompiled code to remote microcontroller 26 to complete the tasks requested. Accordingly, tasks that require large amounts of data to be sent through high-latency connection 24 can be sent in packages sized to increase speed of transmission. Further, applet 27 can establish a streaming connection, such that system 10 can start applet 27 running on remote microcontroller 26 and execute code to open a streaming connection between computer 22 and remote microcontroller 26. Then large amounts of data can stream from computer 22 to remote microcontroller 26. Remote microcontroller 26 can then process and execute the data to create low level protocol operations to transmit to embedded processor 30. In this way, a streaming data connection allows for debugging of the embedded processor 30 without requiring additional memory to store all of the data that was streamed.

Figure 5A:
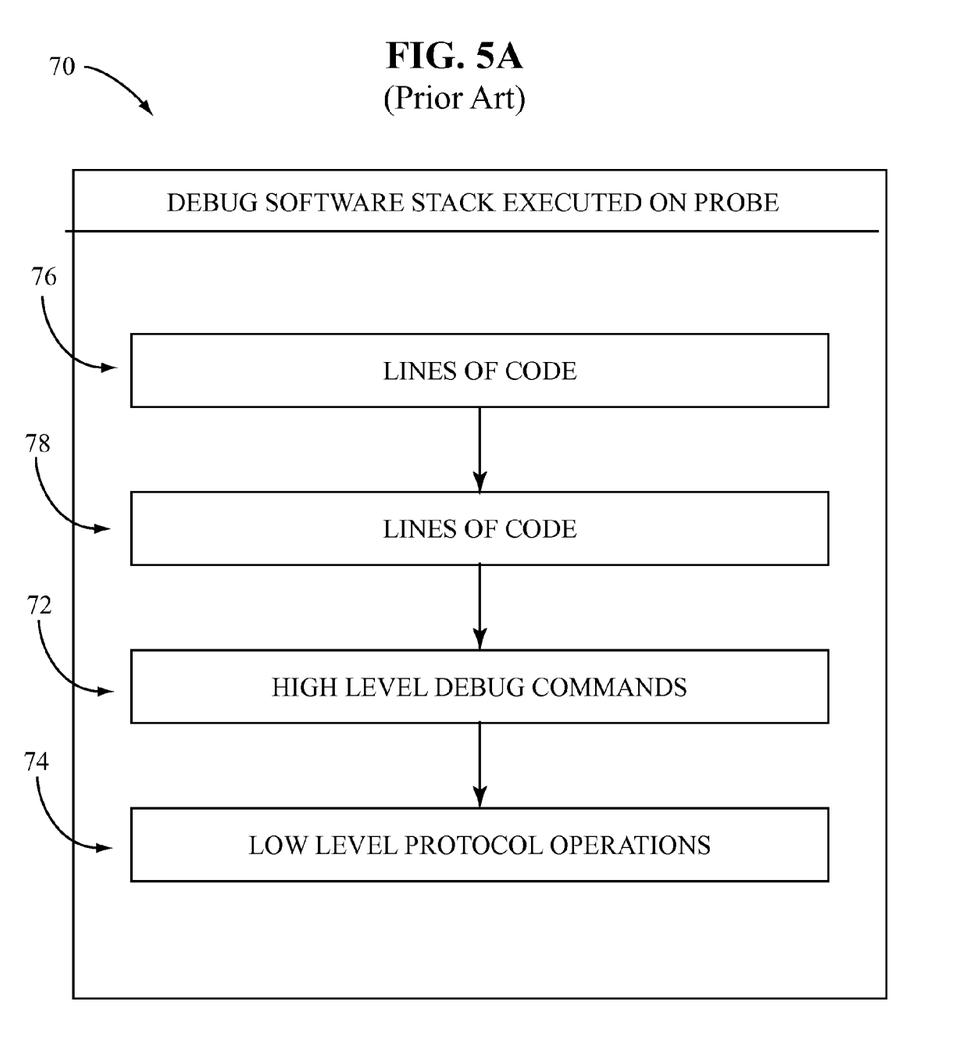
FIG. 5A shows a chart of a debug software stack executed with prior art systems.

FIG. 5A is a simplified block diagram illustrating an example of a prior art debug software stack 70 executed on a probe. Debug software stack 70 includes high level debug commends 72 and low level protocol operations 74. Lines of code 76 and 78 of debug software stack 70 are executed on a hardware probe to initiate the sending and receiving of commands to the processor. Additionally, both high level debug commands 72 and low level protocol operations 74 are executed on the hardware probe resulting in all commands executing on the hardware probe.

Figure 5B:
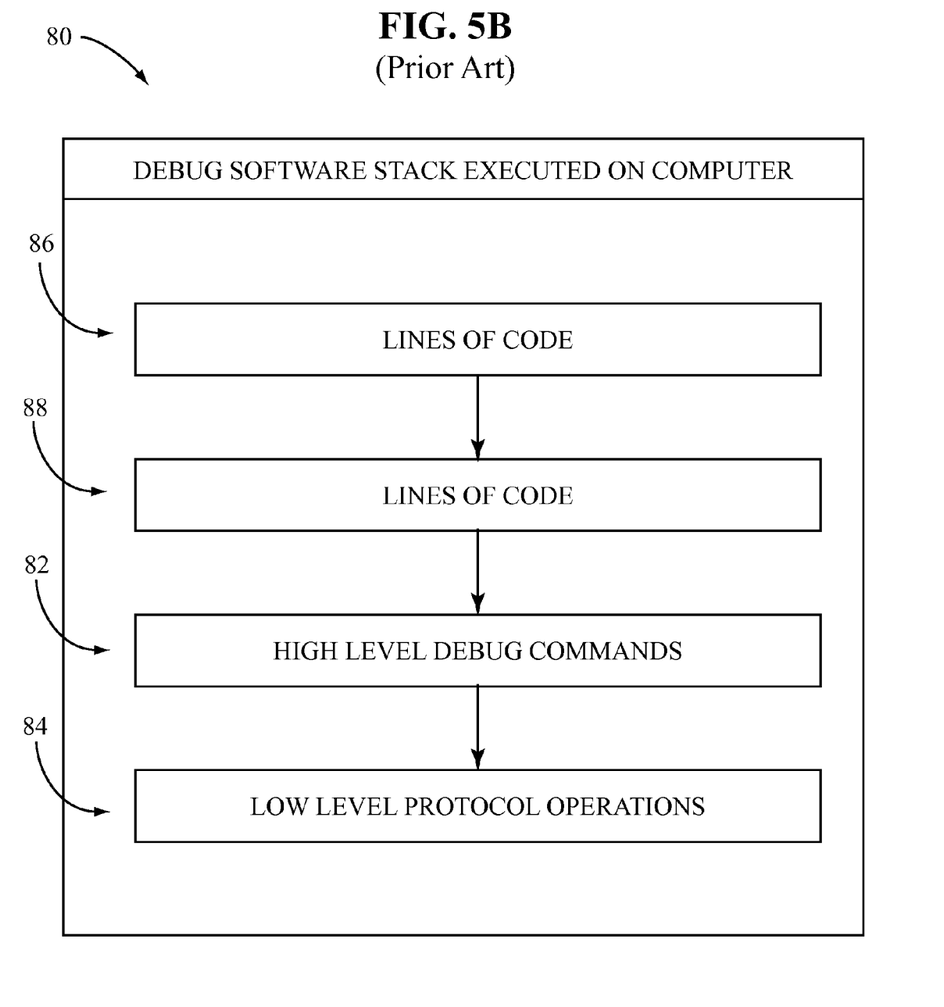
FIG. 5B shows a chart of another debug software stack executed with prior art systems.

FIG. 5B shows an example of a prior art debug software stack 80 executed on a computer. Debug software stack 80 includes high level debug commends 82 and low level protocol operations 84. Lines of code 86 and 88 of debug software stack 80 are executed on the computer to initiate sending and receiving data to an embedded processor through a minimal probe or wiggler. Additionally, both high level debug commands 72 and low level protocol operations 74 executed on the computer resulting in all commands executing on the computer.

Figure 6:
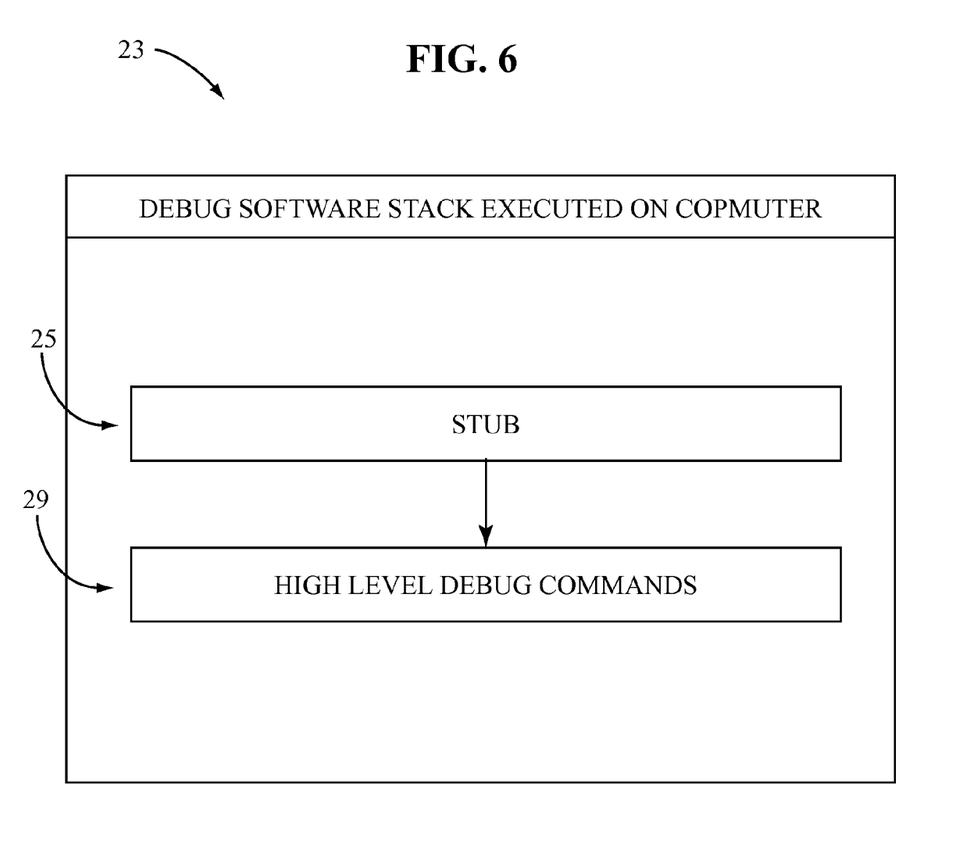
FIG. 6 shows a chart of a debug software stack executed with a computer of an embedded software debug system with partial hardware acceleration.
Figure 7:
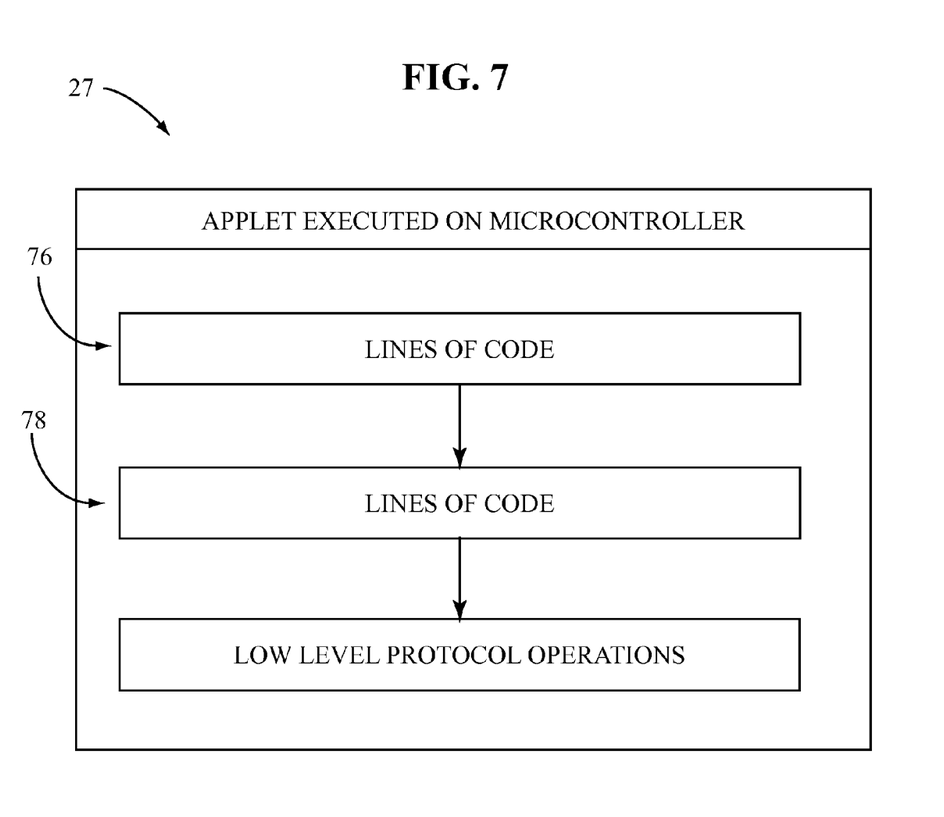
FIG. 7 shows a chart of an applet executed with a remote microcontroller of an embedded software debug system with partial hardware acceleration.

FIGS. 6 and 7 vary from the prior art debug software stacks 70 and 80, separating the high level debug commands from the low level protocol operations and executing the high level debug commands on computer 22 and sending the low level protocol operations to remote microcontroller 26 for execution on remote microcontroller 26. In FIG. 6, debug software stack 23 includes stub 25 and high level algorithms 29 compiled and executed on computer 22. High level algorithms 29 correspond to high level debug commands 72 and 82. As previously discussed, stub 25 replaced low level protocol operations in the debug software stack 23 and triggers sending of applet 27 to remote microcontroller 26.

In FIG. 7, applet 27 includes all of the low level protocol operations as well as lines of code 76 and 78 for initiating the sending and receiving of data to and from the embedded processor. Low level protocol operations of applet 27 correspond to the low level protocol operations 74 and 84 of the prior art debug tools. These low level protocol operations are performance-critical tight loops that are precompiled in native microcontroller machine code. As shown in this embodiment depicted in FIGS. 6 and 7, stub 25 either triggers sending of applet 27 or sending of data to start execution of applet 27 if applet 27 is cached on remote microcontroller 26 (FIG. 1).

Executing and running complex calculations on computer 22 (FIG. 1) enables that portion of debug software stack 23 to run fast without requiring an expensive, high powered embedded system in the hardware probe. Further, running tight loops on remote microcontroller 26 allows larger operations and data blocks to be sent across the high-latency connection 24 (FIG. 1) between computer 22 and remote microcontroller 26 without incurring a delay in transmission of data for every low level protocol operation. Additionally, since applet 27 is compiled in native microcontroller machine code instead of scripts, system 20 (FIG. 1) improves performance, saves resources and makes it easy to use existing source code without significant changes.

Figure 8:
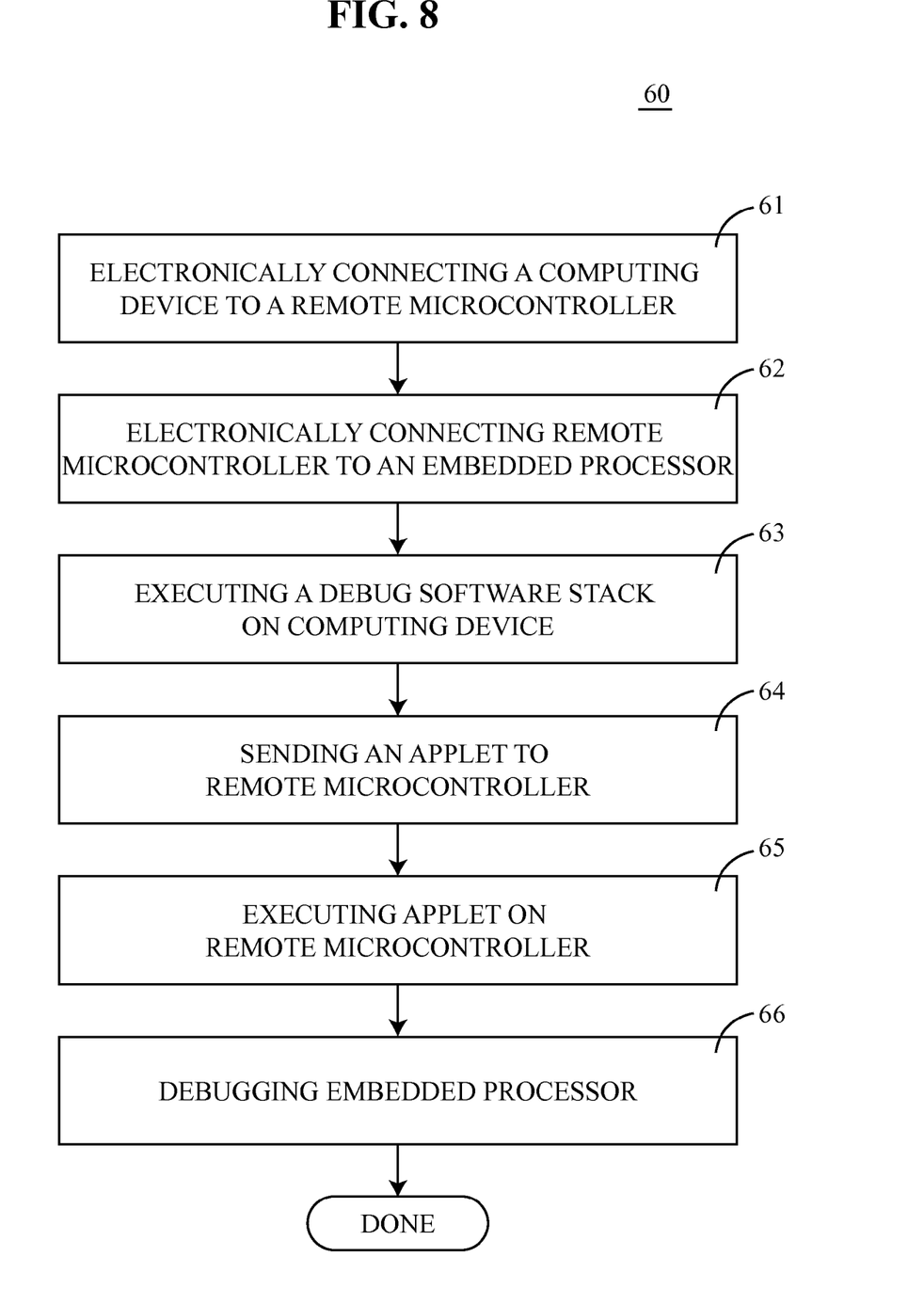
FIG. 8 shows a flow chart of a method for debugging an embedded processor using an embedded software debug system with partial hardware acceleration.

FIG. 8 shows a flow chart of a method 60 for debugging an embedded processor using embedded software debug system 20 (FIG. 1) with partial hardware acceleration in accordance with an embodiment. Method 60 is executed to debug an embedded processor by utilizing a computer and a remote microcontroller.

For clarity and ease of explanation, the processes of method 60 are described in connection with embedded software debug system 20 shown in FIGS. 1, 3 and 4. As such, reference should be made to FIGS. 1, 3 and 4 in connection with the steps of method 60. However, it should be appreciated that method 60 may be readily implemented by embedded software debug system 20 of FIG. 2.

Method 60 may begin with a process 61. Process 61 entails electronically connecting a computer (e.g., 22) to a remote microcontroller (e.g., 26). This connection may be a high-latency connection (e.g., 24). Examples of high-latency connections are USB connections or Ethernet connections.

In addition to step 61, step 62 is performed. Step 62 entails electronically connecting remote microcontroller (e.g., 26) to an embedded processor (e.g., 30). This connection may be a low-latency connection (e.g., 28). Examples of low-latency connections include JTAG connectors or BDM connectors.

Method 60 continues with step 63, which entails executing a debug software stack (e.g., 23) on computer (e.g., 22). Debug software stack includes high level operations, such as high level algorithms. Further, debug software stack includes a stub (e.g., 25), wherein the stub replaces a portion of debug code from which debug software stack was derived and the replaced code is now included in an applet (e.g., 27).

Step 63 leads to step 64. Step 64 entails sending an applet (e.g., 27) to remote microcontroller (e.g., 26). Executing the stub in step 63 triggers step 64 of sending applet (e.g., 27). Applet (e.g., 27) includes performance critical tight-loops. Step 64 may include a step prior to sending applet (e.g., 27), wherein the prior step includes compiling applet code into native microcontroller machine code. Further still, the method 60 may include a step prior to compiling the applet code that includes identifying performance-critical tight loops to be implemented in the applet as discussed previously.

Method 60 then moves to step 65. Step 65 entails executing applet (e.g. 27) on remote microcontroller (e.g. 26). Execution of applet (e.g. 27) on remote microcontroller (e.g. 26) results in sending queries to embedded processor (e.g. 30), as part of method 60 for debugging embedded processor (e.g. 30).

In addition to other method steps discussed previously, method 60 also includes step 66. Step 66 includes debugging embedded processor (e.g. 30) in response to executing debug software stack (e.g. 23) on computer (e.g. 22) and applet (e.g. 27) on remote microcontroller (e.g. 26). The combined execution of these separate source codes are required to debug embedded processor (e.g. 30).

During the method of debugging, method 60 embodiments may also employ additional steps. For example, method 60 may also include caching a most recent executed applet on a server of said remote microcontroller; or caching multiple applets on said server of said remote microcontroller. Further, method 60 may account for an applet (e.g. 27) that establishes a streaming connection between computer (e.g. 22) and remote microcontroller (e.g. 26), wherein executing applet (e.g. 27) by remote microcontroller (e.g. 26) includes progressively streaming data to applet (e.g. 27).

Performance of method 60 results in debugging of embedded processor 30. Other method steps may be incorporated with method 60 to provide for efficient and high quality debugging of embedded processors.

In summary, embodiments of the invention include an embedded software debug system with partial hardware acceleration that executes high level operations on a computer and sends performance-critical tight loops to a remote microcontroller that is connected to an embedded processor. A debug software stack is executed by a computer to perform high level operations. As part of execution of the debug software stack, the computer sends an applet to a remote microcontroller, wherein the applet includes performance-critical tight loops. The remote microcontroller executes the applet and performs tasks with respect to the embedded processor as part of a debugging methodology. Embodiments of the invention provide for a more cost effective system for performing debugging operations while having increased speed of the debugging process.

Although the preferred embodiments of the invention have been illustrated and described in detail, it will be readily apparent to those skilled in the art that various modifications may be made therein without departing from the spirit of the invention or from the scope of the appended claims. That is, it should be appreciated that the exemplary embodiments are only examples, and not intended to limit the scope, applicability, or configuration of the invention.

What is claimed is:

1. An embedded software debug system comprising:
    an embedded processor configured to execute embedded software instructions;
    a computer comprising a processor configured to execute a debug software stack, wherein the debug software stack comprises a set of instructions for debugging the embedded software instructions; and
    a remote microcontroller, communicatively coupled to the computer through a high-latency connection and the embedded processor through a low-latency connection, and configured to:
        receive an applet from the computer in response to execution of a stub of the debug software stack, wherein the applet comprises a subset of the set of instructions for debugging the embedded software instructions and the stub replaces the subset of the set of instructions forming the applet, and
        execute the applet to debug the embedded software instructions executed on the embedded processor.

2. The system of claim 1 wherein said remote microcontroller comprises a server for caching multiple applets.

3. The system of claim 1 wherein said remote microcontroller comprises a core on a chip, wherein the chip comprises said embedded processor.

4. The system of claim 3 wherein said chip comprises a plurality of embedded processors and said remote microcontroller that is a core on said chip is electronically connected to the plurality of embedded processors for debugging.

* * * * *